(12) United States Patent
Wilson et al.

(10) Patent No.: US 11,420,861 B2
(45) Date of Patent: Aug. 23, 2022

(54) DISPENSER WITH HAPTIC FEEDBACK TOUCH-TO-POUR USER INTERFACE

(71) Applicant: THE COCA-COLA COMPANY, Atlanta, GA (US)

(72) Inventors: Jamal Omari Wilson, Snellville, GA (US); Damian James Reec Mycroft, Decatur, GA (US); Christopher J. Dennis, Milton, GA (US); James Ravenhall, London (GB); Thomas Maxime Vaubourgeix, London (GB); Louis Hvejsel Bork, London (GB); Simon Alan Daniel, London (GB); Lewis Wood, Bristol (GB); James Holmes, Nailsworth (GB)

(73) Assignee: The Coca-Cola Company, Atlanta, GA (US)

( * ) Notice: Subject to any disclaimer, the term of this patent is extended or adjusted under 35 U.S.C. 154(b) by 146 days.

(21) Appl. No.: 16/764,700

(22) PCT Filed: Nov. 15, 2018

(86) PCT No.: PCT/US2018/061278
§ 371 (c)(1),
(2) Date: May 15, 2020

(87) PCT Pub. No.: WO2019/099668
PCT Pub. Date: May 23, 2019

(65) Prior Publication Data
US 2021/0171331 A1 Jun. 10, 2021

Related U.S. Application Data

(60) Provisional application No. 62/586,497, filed on Nov. 15, 2017.

(51) Int. Cl.
*B67D 1/08* (2006.01)
*G06F 3/01* (2006.01)
(Continued)

(52) U.S. Cl.
CPC .......... *B67D 1/0888* (2013.01); *G06F 3/016* (2013.01); *G06F 3/0482* (2013.01);
(Continued)

(58) Field of Classification Search
CPC ..... B67D 1/0888; G06F 3/016; G06F 3/0482; G06F 3/0488; G07F 9/023; G07F 13/06
(Continued)

(56) References Cited

U.S. PATENT DOCUMENTS 7,455,867 B1 * 11/2008 Gutwein .............. A47J 31/002
426/594
8,032,251 B2 * 10/2011 Monn ................... G07F 9/0235
700/233

(Continued)

FOREIGN PATENT DOCUMENTS

| WO | 2007-011241 A1 | 1/2007 |
| WO | 2013-067020 A1 | 5/2013 |
| WO | 2017122152 A1 | 7/2017 |

OTHER PUBLICATIONS

Extended European Search Report issued in EP 18877827.8, dated Jun. 23, 2021.
(Continued)

*Primary Examiner* — William D Titcomb
(74) *Attorney, Agent, or Firm* — Meunier Carlin & Curfman LLC

(57) ABSTRACT

Described herein are example systems and methods of user interfaces on a product dispenser. The product dispenser includes a touch-to-pour user interface configured to provide a pattern of haptic feedback to a user while a touch is sensed
(Continued)

on the touch-to-pour user interface. At the same time, the product dispenser is configured to dispense a product while the touch is sensed on the touch-to-pour user interface. The pattern of haptic feedback is dependent upon the product being dispensed from the product dispenser.

20 Claims, 12 Drawing Sheets

(51) Int. Cl.

| | | |
|---|---|---|
| *G06F 3/0482* | (2013.01) | |
| *G06F 3/0488* | (2022.01) | |
| *G07F 13/06* | (2006.01) | |
| *G07F 9/02* | (2006.01) | |
| *G06F 3/02* | (2006.01) | |
| *G06F 3/041* | (2006.01) | |
| *G06F 3/044* | (2006.01) | |
| *G06F 3/045* | (2006.01) | |
| *G06F 3/04817* | (2022.01) | |

(52) U.S. Cl.
CPC ............ *G06F 3/0488* (2013.01); *G07F 9/023* (2013.01); *G07F 13/06* (2013.01); *G06F 3/02* (2013.01); *G06F 3/044* (2013.01); *G06F 3/045* (2013.01); *G06F 3/0414* (2013.01); *G06F 3/04817* (2013.01)

(58) Field of Classification Search
USPC .......................................................... 222/23
See application file for complete search history.

(56) References Cited

U.S. PATENT DOCUMENTS

| | | | |
|---|---|---|---|
| 2002/0080188 A1* | 6/2002 | Somashekaraiah .......................... | |
| | | | G06F 3/04897 |
| | | | 715/810 |
| 2008/0183330 A1 | 7/2008 | Monn | |
| 2009/0070234 A1* | 3/2009 | Peters ....................... | G07F 9/02 |
| | | | 705/26.1 |
| 2011/0049180 A1* | 3/2011 | Carpenter ............ | B67D 1/0051 |
| | | | 222/1 |
| 2013/0044049 A1 | 2/2013 | Biggs et al. | |
| 2013/0106690 A1* | 5/2013 | Lim ...................... | G07F 13/065 |
| | | | 345/156 |
| 2013/0127755 A1 | 5/2013 | Lynn et al. | |
| 2016/0052007 A1 | 2/2016 | Fuller et al. | |
| 2016/0195931 A1 | 7/2016 | Czelnik et al. | |
| 2017/0247174 A1 | 8/2017 | Furner et al. | |

OTHER PUBLICATIONS

International Preliminary Report on Patentability issued by the International Bureau of WIPO in PCT Application No. PCT/US2018/061278 dated May 28, 2020 10 pages.
International Search Report and Written Opinion issued by the International Searching Authority (ISA/KR) in PCT Application No. PCT/US2018/061278 dated Mar. 6, 2019. 14 pages.
Greene, Michael, Haptic Feedback Technology, ECE480: Design Team 4, Application Note, Dec. 1, 2015, 13 pages.
Southwest Center for Microsystems Education (SCME), University of New Mexico, Introduction to Transducers, Sensors, and Actuators PK Activity, Participant Guide, May 16, 2017, 29 pages.
Lexico.com/en/definition/haptic, Definition of haptic in English, accessed Feb. 17, 2022, 2 pages.
Lexico.com/en/definition/transducer, Definition of transducer in English, accessed Feb. 17, 2022, 2 pages.

* cited by examiner

DISPENSER WITH HAPTIC FEEDBACK TOUCH-TO-POUR USER INTERFACE

CROSS REFERENCE TO RELATED APPLICATIONS

This application is a national stage application filed under 35 U.S.C. § 371 of PCT/US2018/061278 on Nov. 15, 2018, which claims the benefit of U.S. Provisional Patent Application Ser. No. 62/586,497 filed Nov. 15, 2017, the disclosures of which are expressly incorporated herein by reference.

BACKGROUND

Traditional post-mix beverage dispensing systems generally mix streams of syrup, concentrate, sweetener, bonus flavors, other types of flavorings, and/or other ingredients with water or other types of diluents by flowing the syrup stream down the center of the nozzle with the water stream flowing around the outside. The syrup stream is directed downward with the water stream such that the streams mix as they fall into a consumer's cup. There is a desire for a beverage dispensing system as a whole to provide as many different types and flavors of beverages as may be possible in a footprint that may be as small as possible. Recent improvements in beverage dispensing technology have focused on the use of micro-ingredients. With micro-ingredients, the traditional beverage bases may be separated into their constituent parts at much higher dilution or reconstitution ratios.

This technology is enabled via cartridges containing the highly concentrated micro-ingredients. The micro-ingredients are mixed with sweeteners and still or sparkling water using precise metering and dosing technologies and dispensed through a nozzle that promotes in-air mixing so as to prevent carry-over. The technology includes a user input for a user to select a desired beverage, customize the beverage if desired, and pour the beverage at the dispenser. These beverages are made from precise recipes to ensure a great tasting beverage regardless of the customization.

SUMMARY

Aspects of the disclosure provide for a product dispense that comprises a touch sensor configured to detect a selection on a surface of the beverage dispenser. The product dispenser also comprises a haptic feedback transducer coupled to the surface and configured to produce a pattern of haptic feedback to the surface while the touch sensor detects the selection on the surface. The product dispenser also comprises a nozzle configured to dispense a product while the touch sensor detects the selection on the surface.

In some aspects of the disclosure, the product dispenser also comprises a user interface configured to receive a selection of the product to be dispensed from the product dispenser.

In some aspects of the disclosure, the user interface is one of: a touchscreen display, wherein the selection of the product to be dispensed is received upon detection by the touchscreen of selection of an icon of the product; a button, wherein the selection of the product to be dispensed is received upon depression of the button; or a lever, wherein the selection of the product to be dispensed is received upon articulation of the lever.

In some aspects of the disclosure, the pattern of haptic feedback is based on the product. In some aspects of the disclosure, the haptic feedback transducer is configured to produce a second pattern of haptic feedback to the surface for a second product.

In some aspects of the disclosure, the haptic feedback transducer is one of a linear resonant actuator, an eccentric rotating mass, or a piezoelectric actuator.

In some aspects of the disclosure, the pattern of haptic feedback is produced as a vibration wave or pressure wave.

In some aspects of the disclosure, the touch sensor is one of a capacitive touch sensor, a resistive touch sensor, a strain gauge, a button, or a switch.

In some aspects of the disclosure, the product dispenser also comprises a haptic feedback module. The haptic feedback module includes a back cover coupled to a frame of the product dispenser. The haptic feedback module also includes a printed circuit board coupled to the back cover and positioned between the haptic feedback transducer and the surface. The haptic feedback module also includes a transfer plate coupled between the haptic feedback transducer and the surface and configured to transfer the pattern of haptic feedback from the haptic feedback transducer to the surface, wherein the transfer plate is not in contact with the back cover or printed circuit board.

In some aspects of the disclosure, the printed circuit board is coupled to a boss that extends from the printed circuit board to the back cover, wherein the transfer plate comprises an aperture through which the boss extends.

In some aspects of the disclosure, the surface is coupled to the back cover such that the surface is able to move relative to the back cover.

In some aspects of the disclosure, the haptic feedback module also comprises a flexible seal between the surface and the back cover.

In some aspects of the disclosure, the user interface is on the surface.

In some aspects of the disclosure, the user interface is physically separate from the surface.

Aspects of the disclosure provide for a haptic feedback user interface that comprises a back cover and a front cover coupled to the back cover to form an enclosure. The front cover is coupled to the back cover for relative motion therebetween. The haptic feedback user interface also comprises a haptic feedback transducer coupled to the back cover, the haptic feedback transducer including an actuator. The haptic feedback user interface also comprises an electronics module coupled to the back cover by a boss and positioned between the front cover and the actuator. The haptic feedback user interface also comprises a transfer plate coupled to the actuator of the haptic feedback transducer and coupled to the front cover. The transfer plate comprises an aperture through which the boss extends.

In some aspects of the disclosure, the front cover comprises a flange that extends past the electronics module towards the back cover. The transfer plate is coupled to the flange of the front cover.

In some aspects of the disclosure, the electronics module is a display. The display is a liquid crystal display, an organic liquid crystal display, a quantum dot liquid crystal display, a plasma display, or a light emitting diode. In some aspects of the disclosure, the front cover comprises an aperture with a transparent surface placed therein for viewing the display therethrough. In some aspects of the disclosure, haptic feedback user interface also comprises a touch sensor coupled to the transparent surface and configured to detect a touch of the transparent surface. The touch sensor is one of a capacitive touch sensor, a resistive touch sensor, a strain gauge, a button, or a switch.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
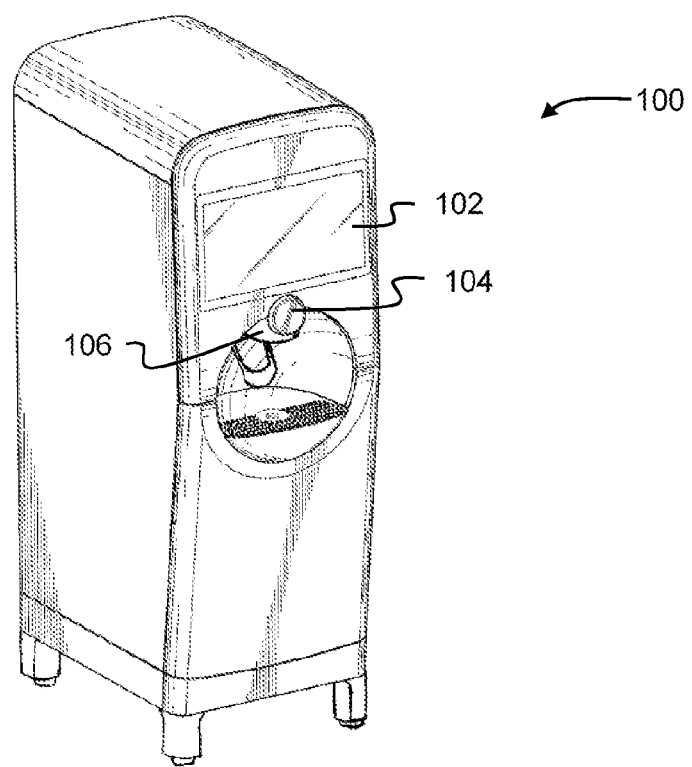
FIG. 1 illustrates an exemplary product dispenser according to various embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A", "B", and/or "C" means "A", or "B", or "C", or "A and B", or "A and C", or "A and B and C".

Described herein are example systems and methods of user interfaces on a product dispenser. The product dispenser includes a touch-to-pour user interface configured to provide a pattern of haptic feedback to a user while a touch is sensed on the touch-to-pour user interface. At the same time, the product dispenser is configured to dispense a product while the touch is sensed on the touch-to-pour user interface. The pattern of haptic feedback is dependent upon the product being dispensed from the product dispenser.

For example, the product dispenser may additionally include a product selection user interface configured to receive a selection of a desired product to be dispensed. Depending on the product selected, a different haptic feedback pattern may be provided to the touch-to-pour user interface. For example, in a beverage dispenser, upon dispensing a carbonated beverage, the touch-to-pour user interface may provide a first haptic feedback that provides the sensation of bubbles. Upon dispensing a non-carbonated beverage, the touch-to-pour user interface may provide a second haptic feedback that provides the sensation of a wave or ripple.

In various embodiments, the touch-to-pour user interface includes a display or other electronic module towards a front surface of the user interface for displaying a product to be dispensed upon selection and/or to sense when a user has touched the surface. The display or other electronic module may be affixed to the product dispenser via one or more bosses. A haptic feedback transducer is positioned behind the display or other electronic module. In other words, the display or other electronic module is positioned between the haptic feedback transducer and the surface upon which the transducer is to provide the haptic feedback. Accordingly, a transfer plate is provided that is coupled to the haptic feedback transducer and extends along and around the display or electronic module. The transfer plate may include one or more apertures through which the one or more bosses extend to support the display or other electronics module. In this way, the haptic feedback transducer is coupled to the user interface surface to provide haptic feedback to a user while at the same time vibrationally isolated from the display or other electronic module. Vibrationally isolating the display or other electronic module from the haptic feedback transducer improves the operational life and reduces failure modes for the display or other electronic module.

The product dispenser described herein may be a beverage dispensing system (such as a Coca-Cola® Freestyle®, traditional fountain dispenser, or traditional fountain dispenser with micro-ingredients). A beverage dispensing system combines a plurality of beverage ingredients, such as water or carbonated water and one or more flavoring ingredients to create a finished beverage. The beverage dispensing system may include one or more macro-ingredients (such as sweeteners, water, or carbonated water) and one or more micro-ingredients (such as high intensity sweeteners, flavorings, food acids, or additives). Such micro-dosing functionality may increase the dispensing capabilities of the beverage dispensing system to deliver a large variety of beverages and improve the quality of the beverage dispensed by the beverage dispensing system.

Generally described, the macro-ingredients may have reconstitution ratios in the range from full strength (no dilution) to about six (6) to one (1) (but generally less than about ten (10) to one (1)). As used herein, the reconstitution ratio refers to the ratio of diluent (e.g., water or carbonated water) to beverage ingredient. Therefore, a macro-ingredient with a 5:1 reconstitution ratio refers to a macro-ingredient that is to be dispensed and mixed with five parts diluent for every part of the macro-ingredient in the finished beverage. Many macro-ingredients may have reconstitution ratios in the range of about 3:1 to 5.5:1, including 4.5:1, 4.75:1, 5:1, 5.25:1, 5.5:1, and 8:1 reconstitution ratios.

The macro-ingredients may include sweeteners such as sugar syrup, HFCS ("High Fructose Corn Syrup"), FIS ("Fully Inverted Sugar"), MIS ("Medium Inverted Sugar"), mid-calorie sweeteners comprised of nutritive and non-nutritive or high intensity sweetener blends, and other such nutritive sweeteners that are difficult to pump and accurately meter at concentrations greater than about 10:1—particularly after having been cooled to standard beverage dispensing temperatures of around 35-45° F. An erythritol sweetener may also be considered a macro-ingredient sweetener when used as the primary sweetener source for a beverage, though typically erythritol will be blended with other sweetener sources and used in solutions with higher reconstitution ratios such that it may be considered a micro-ingredient as described below.

The macro-ingredients may also include traditional BIB ("bag-in-box") flavored syrups (e.g., COCA-COLA bag-in-box syrup) which contain all of a finished beverage's sweetener, flavors, and acids that when dispensed is to be mixed with a diluent source such as plain or carbonated water in ratios of around 3:1 to 6:1 of diluent to the syrup. Other typical macro-ingredients may include concentrated extracts, purees, juice concentrates, dairy products or concentrates, soy concentrates, and rice concentrates.

The macro-ingredient may also include macro-ingredient base products. Such macro-ingredient base products may include the sweetener as well as some common flavorings, acids, and other common components of a plurality of different finished beverages. However, one or more additional beverage ingredients (either micro-ingredients or macro-ingredients as described herein) other than the diluent are to be dispensed and mix with the macro-ingredient base product to produce a particular finished beverage. In other words, the macro-ingredient base product may be dispensed and mixed with a first micro-ingredient non-sweetener flavor component to produce a first finished beverage. The same macro-ingredient base product may be dispensed and mixed with a second micro-ingredient non-sweetener flavor component to produce a second finished beverage.

The macro-ingredients described above may be stored in a conventional bag-in-box container in, at and/or remote from the dispenser. The viscosity of the macro-ingredients may range from about 1 to about 10,000 centipoise and generally over 100 centipoises or so when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. In some instances, the viscosities of the micro-ingredients may be forty (40) centipoise or less. Examples of micro-ingredients include natural or artificial flavors; flavor additives; natural or artificial colors; artificial sweeteners (high potency, nonnutritive, or otherwise); antifoam agents, nonnutritive ingredients, additives for controlling tartness, e.g., citric acid or potassium citrate; functional additives such as vitamins, minerals, herbal extracts, nutraceuticals; and over the counter (or otherwise) medicines such as pseudoephedrine, acetaminophen; and similar types of ingredients. Various acids may be used in micro-ingredients including food acid concentrates such as phosphoric acid, citric acid, malic acid, or any other such common food acids. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

Typically, micro-ingredients for a finished beverage product include separately stored non-sweetener beverage component concentrates that constitute the flavor components of the finished beverage. Non-sweetener beverage component concentrates do not act as a primary sweetener source for the finished beverage and do not contain added sweeteners, though some non-sweetener beverage component concentrates may have sweet tasting flavor components or flavor components that are perceived as sweet in them. These non-sweetener beverage component concentrates may include the food acid concentrate and food acid-degradable (or non-acid) concentrate components of the flavor, such as described in commonly owned U.S. patent application Ser. No. 11/276,553, entitled "Methods and Apparatus for Making Compositions Comprising and Acid and Acid Degradable Component and/or Compositions Comprising a Plurality of Selectable Components," which is herein incorporated by reference in its entirety. As noted above, micro-ingredients may have reconstitution ratios ranging from about ten (10) to one (1) and higher, where the micro-ingredients for the separately stored non-sweetener beverage component concentrates that constitute the flavor components of the finished beverage typically have reconstitution ratios ranging from 50:1, 75:1, 100:1, 150:1, 300:1, or higher.

For example, the non-sweetener flavor components of a cola finished beverage may be provided from separately stored first non-sweetener beverage component concentrate and a second non-sweetener beverage component concentrate. The first non-sweetener beverage component concentrate may comprise the food acid concentrate components of the cola finished beverage, such as phosphoric acid. The second non-sweetener beverage component concentrate may comprise the food acid-degradable concentrate components of the cola finished beverage, such as flavor oils that would react with and impact the taste and shelf life of a non-sweetener beverage component concentrate were they to be stored with the phosphoric acid or other food acid concentrate components separately stored in the first non-sweetener component concentrate. While the second non-sweetener beverage component concentrate does not include the food acid concentrate components of the first non-sweetener beverage component concentrate (e.g., phosphoric acid), the second non-sweetener beverage component concentrate may still be a high-acid beverage component solution (e.g., pH less than 4.6).

A finished beverage may have a plurality of non-sweetener concentrate components of the flavor other than the acid concentrate component of the finished beverage. For example, the non-sweetener flavor components of a cherry cola finished beverage may be provided from the separately stored non-sweetener beverage component concentrates described in the above example as well as a cherry non-sweetener component concentrate. The cherry non-sweetener component concentrate may be dispensed in an amount consistent with a recipe for the cherry cola finished beverage. Such a recipe may have more, less, or the same amount of the cherry non-sweetener component concentrate than other recipes for other finished beverages that include the cherry non-sweetener component concentrate. For example, the amount of cherry specified in the recipe for a cherry cola finished beverage may be more than the amount of cherry specified in the recipe for a cherry lemon-lime finished beverage to provide an optimal taste profile for each of the finished beverage versions. Such recipe-based flavor versions of finished beverages are to be contrasted with the addition of flavor additives or flavor shots as described below.

Other typical micro-ingredients for a finished beverage product may include micro-ingredient sweeteners. Micro-ingredient sweeteners may include high intensity sweeteners such as aspartame, Ace-K, steviol glycosides (e.g., Reb A, Reb M), sucralose, saccharin, or combinations thereof. Micro-ingredient sweeteners may also include erythritol when dispensed in combination with one or more other sweetener sources or when using blends of erythritol and one or more high intensity sweeteners as a single sweetener source.

Other typical micro-ingredients for supplementing a finished beverage product may include micro-ingredient flavor additives. Micro-ingredient flavor additives may include additional flavor options that can be added to a base beverage flavor. The micro-ingredient flavor additives may be non-sweetener beverage component concentrates. For example, a base beverage may be a cola flavored beverage, whereas cherry, lime, lemon, orange, and the like may be added to the cola beverage as flavor additives, sometimes referred to as flavor shots. In contrast to recipe-based flavor versions of finished beverages, the amount of micro-ingredient flavor additive added to supplement a finished beverage may be consistent among different finished beverages. For example, the amount of cherry non-sweetener component concentrate included as a flavor additive or flavor shot in a cola finished beverage may be the same as the amount of cherry non-sweetener component concentrate included as a flavor additive or flavor shot in a lemon-lime finished beverage. Additionally, whereas a recipe-based flavor version of a finished beverage is selectable via a single finished beverage selection icon or button (e.g., cherry cola icon/button), a flavor additive or flavor shot is a supplemental selection in addition to the finished beverage selection icon or button (e.g., cola icon/button selection followed by a cherry icon/button selection).

As is generally understood, such beverage selections may be made through a touchscreen user interface or other typical beverage user interface selection mechanism (e.g., buttons) on a beverage dispenser. The selected beverage, including any selected flavor additives, may then be dispensed upon the beverage dispenser receiving a further dispense command through a separate dispense button on the touchscreen user interface or through interaction with a separate pour mechanism such as a pour button (electromechanical, capacitive touch, or otherwise) or pour lever.

In the traditional BIB flavored syrup delivery of a finished beverage, a macro-ingredient flavored syrup that contains all of a finished beverage's sweetener, flavors, and acids is mixed with a diluent source such as plain or carbonated water in ratios of around 3:1 to 6:1 of diluent to the syrup. In contrast, for a micro-ingredient delivery of a finished beverage, the sweetener(s) and the non-sweetener beverage component concentrates of the finished beverage are all separately stored and mixed together about a nozzle when the finished beverage is dispensed. Example nozzles suitable for dispensing of such micro-ingredients include those described in commonly owned U.S. provisional patent application Ser. No. 62/433,886, entitled "Dispensing Nozzle Assembly," PCT patent application Ser. No. PCT/US15/026657, entitled "Common Dispensing Nozzle Assembly," U.S. Pat. No. 7,866,509, entitled "Dispensing Nozzle Assembly," or U.S. Pat. No. 7,578,415, entitled "Dispensing Nozzle Assembly," which are all herein incorporated by reference in their entirety.

In operation, the beverage dispenser may dispense finished beverages from any one or more of the macro-ingredient or micro-ingredient sources described above. For example, similar to the traditional BIB flavored syrup delivery of a finished beverage, a macro-ingredient flavored syrup may be dispensed with a diluent source such as plain or carbonated water to produce a finished beverage. Additionally, the traditional BIB flavored syrup may be dispensed with the diluent and one or more micro-ingredient flavor additives to increase the variety of beverages offered by the beverage dispenser.

Micro-ingredient-based finished beverages may be dispensed by separately dispensing each of the two or more non-sweetener beverage component concentrates of the finished beverage along with a sweetener and diluent. The sweetener may be a macro-ingredient sweetener and/or a micro-ingredient sweetener and the diluent may be water and/or carbonated water. For example, a micro-ingredient-based cola finished beverage may be dispensed by separately dispensing food acid concentrate components of the cola finished beverage, such as phosphoric acid, food acid-degradable concentrate components of the cola finished beverage, such as flavor oils, macro-ingredient sweetener, such as HFCS, and carbonated water. In another example, a micro-ingredient-based diet-cola finished beverage may be dispensed by separately dispensing food acid concentrate components of the diet-cola finished beverage, food acid-degradable concentrate components of the diet-cola finished beverage, micro-ingredient sweetener, such as aspartame or an aspartame blend, and carbonated water. As a further example, a mid-calorie micro-ingredient-based cola finished beverage may be dispensed by separately dispensing food acid concentrate components of the mid-calorie cola finished beverage, food acid-degradable concentrate components of the mid-calorie cola finished beverage, a reduced amount of a macro-ingredient sweetener, a reduced amount of a micro-ingredient sweetener, and carbonated water. By reduced amount of macro-ingredient and micro-ingredient sweeteners, it is meant to be in comparison with the amount of macro-ingredient or micro-ingredient sweetener used in the cola finished beverage and diet-cola finished beverage. As a final example, a supplemental flavored micro-ingredient-based beverage, such as a cherry cola beverage or a cola beverage with an orange flavor shot, may be dispensed by separately dispensing a food acid concentrate components of the flavored cola finished beverage, food acid-degradable concentrate components of the flavored cola finished beverage, one or more non-sweetener micro-ingredient flavor additives (dispensed as either as a recipe-based flavor version of a finished beverage or a flavor shot), a sweetener (macro-ingredient sweetener, micro-ingredient sweetener, or combinations thereof), and carbonated water. While the above examples are provided for carbonated beverages, they apply to still beverages as well by substituting carbonated water with plain water.

The various ingredients may be dispensed by the beverage dispenser in a continuous pour mode where the appropriate ingredients in the appropriate proportions (e.g., in a predetermined ratio) for a given flow rate of the beverage being dispensed. In other words, as opposed to a conventional batch operation where a predetermined amount of ingredients are combined, the beverage dispenser provides for continuous mixing and flows in the correct ratio of ingredients for a pour of any volume. This continuous mix and flow method can also be applied to the dispensing of a particular size beverage selected by the selection of a beverage size button by setting a predetermined dispensing time for each size of beverage.

Other beverage dispensers, product dispensers, or touch-to-operate devices may be operated with the user interfaces described throughout the specification.

FIG. 1 illustrates an exemplary product dispenser 100 according to various embodiments of the disclosure. As shown, the product dispenser 100 is a beverage dispenser. The product dispenser 100 includes a product selection user interface 102, a touch-to-pour (TTP) user interface 104, and a nozzle 106. The product selection user interface 102 provides a plurality of selectable product options to be dispensed from the product dispenser 100. The TTP user interface 104 provides a surface with a touch sensor thereon that is configured to detect a user's touch on the surface or detect that a user is currently touching the surface. The touch sensor is also configured to detect when the surface is no longer being touched. The TTP user interface 104 is a distinct user interface from the product selection user interface 102. The nozzle 106 is configured to dispense the product selected on the product selection user interface upon operation of the product dispenser 100.

In operation, upon the TTP user interface 104 detecting a touch on the surface, and so long as the touch remains on the surface, the product dispenser 100 operates to dispense the product selected on the product selection user interface from the nozzle 106. The nozzle 106 may dispense the selected product or one or more constituent parts of the selected product during operation of the product dispenser 100. For example, when the product dispenser 100 is a beverage dispenser, the beverage dispenser operates one or more pumps and/or valves to dispense a plurality of beverage ingredients from the nozzle 106 to dispense the selected beverage.

Figure 2:
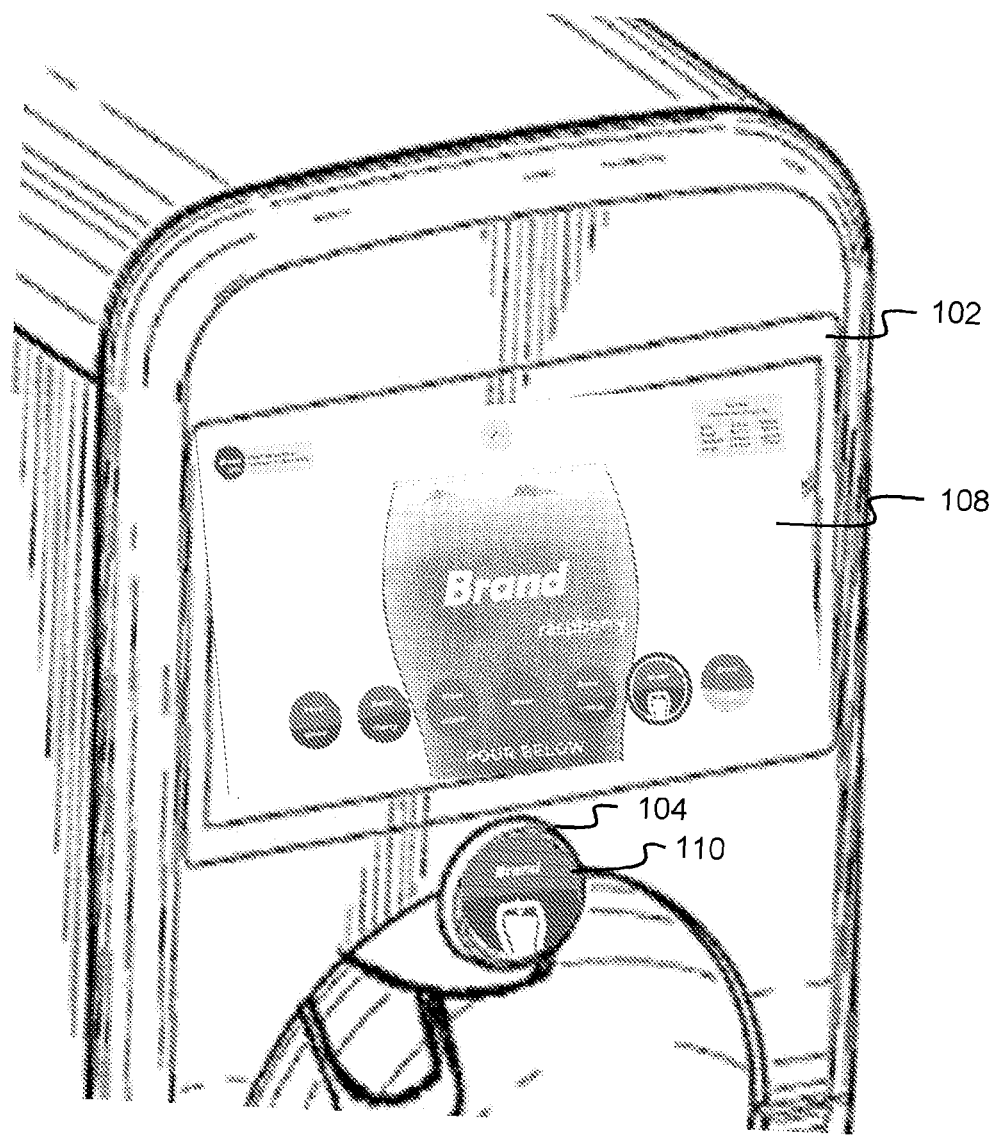
FIG. 2 illustrates the product dispenser with a view of a product selection user interface and a touch-to-pour user interface.
Figure 3:
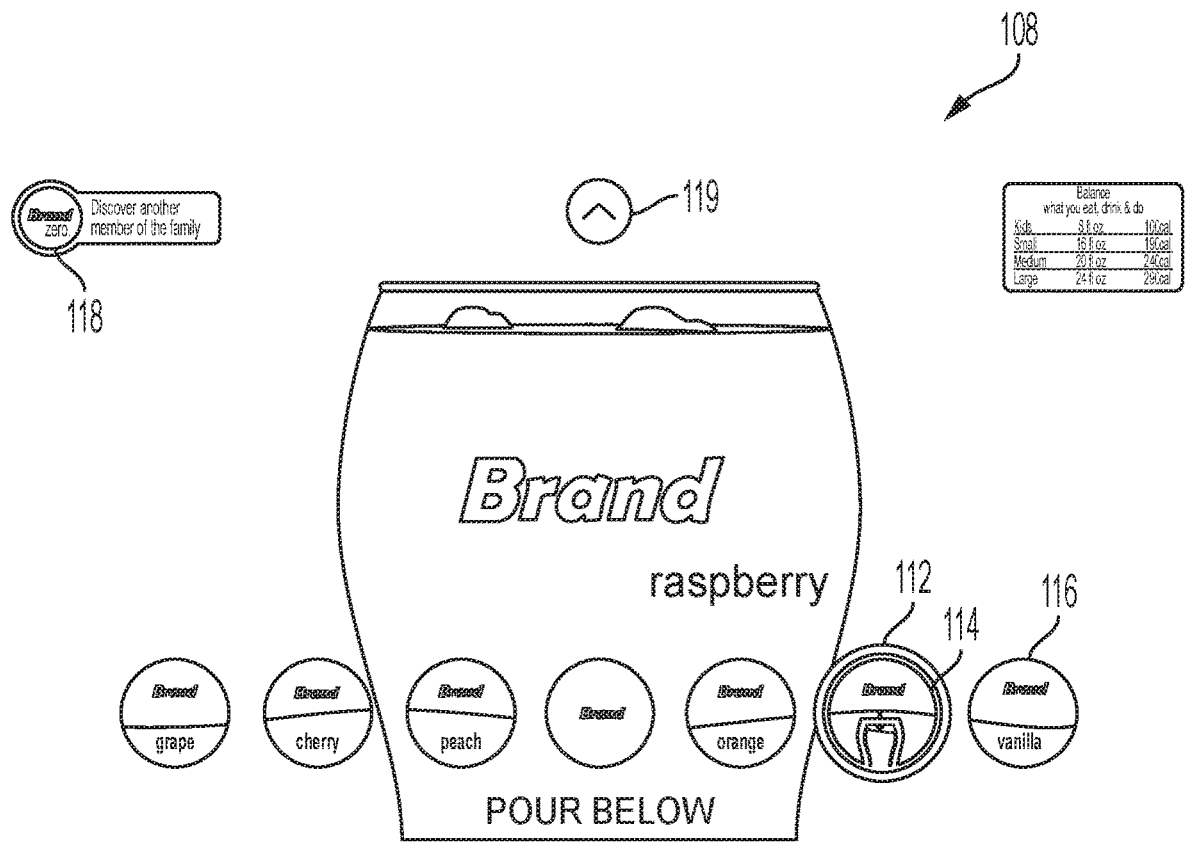
FIG. 3 illustrates the graphical user interface shown on the product selection user interface.

FIGS. 1-3 show the product selection user interface 102 is a touchscreen display. The touchscreen display is configured to display a graphical user interface 108 with a plurality of product selection icons 114, 116. For example, as shown in FIG. 3, each of the product selection icons 114, 116 shows a different flavor variant of a brand of a beverage. The graphical user interface 108 also shows a highlight 112 to indicate a currently selected product, such as the raspberry flavor variant of the brand of beverage shown in FIG. 3.

In some implementations, selectable icons 114, 116 in the graphical user interface 108 may show different flavor additives. For example, upon a particular brand of product being selected on another graphical user interface screen, the graphical user interface 108 may show the plurality of product selection icons 114, 116 with different flavor additives that can be added to the brand of product that was selected on the prior graphical user interface screen. In some implementations, an icon of the brand of product without any flavor additives may be indicated with the highlight by default. In some implementations, only flavor additive icons 114, 116 may be shown in the graphical user interface screen 108. Upon selection of one or more flavor additive icons 114, 116 the highlight 112 may indicate that the flavor additive has been selected. More than one flavor additive may be selected at the same time.

The graphical user interface 108 may include other selectable icons for navigating to one or more other screens (not shown). A product family icon 118 provides a quick navigation to another screen with a plurality of product selection icons 114, 116 for a related product. For example, the product family icon 118 shows a corresponding zero-calorie brand of beverage that corresponds with the brand of beverage shown. While FIG. 3 shows a single product family icon 118, a plurality of product family icons may be present in the same area of the graphical user interface for product families with more than two products. A navigation icon 119 navigates to another screen of the graphical user interface 108, such as a home screen or a prior screen. Other selectable icons may be present on the graphical user interface 108.

The product selection user interface 102 may take other forms than a touchscreen display. For example, the product selection user interface 102 may be a simple display with one or more buttons along a bezel of the display or otherwise positioned outside of the display at locations corresponding to the icons shown on the display. The product selection user interface 102 may simply be a matrix, array, swarm, or other distribution of buttons with an indication of which button corresponds to which product. For example, a product placard placed adjacent to a button may provide the indication. Other graphics, displays, or indications may be used. Other product selection mechanisms may be used, such as a lever, toggle, or other such user interface mechanism.

Figure 4:
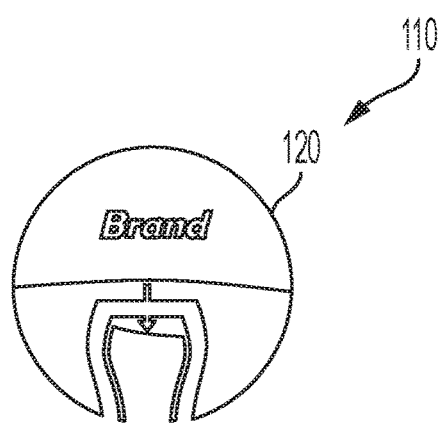
FIG. 4 illustrates the graphical user interface shown on the touch-to-pour user interface.

FIGS. 1-2 and 4 show the TTP user interface 104 is a touch sensitive display. In some implementations, the touch sensitive display is a touchscreen. In some implementations, the touch sensitive display is composed of a touch sensor surface with a transparent viewing portal and a separate display electronic module viewable through the viewing portal. Accordingly, the display electronic module may be positioned behind the touch sensor surface so as to display graphics 120 corresponding to a product selected on the product selection user interface 102. In this implementation, a touch sensor is coupled to the touch sensor surface and is distinct from the display electronic module viewable through the touch sensor surface. The touch sensor may be a capacitive touch sensor, a resistive touch sensor, a strain gauge, a button, a switch, or any other device capable of detecting a touch while a user is touching the touch sensor surface. The display electronic module may be a liquid crystal display, an organic liquid crystal display, a quantum dot liquid crystal display, or a plasma display. Other touch sensors and display modules may be used.

The touch sensitive display is configured to display a graphical user interface 110 with graphics 120 that correspond to the product selected on the product selection user interface 102. For example, upon selection of the product selection icon 114 in the product selection user interface 102 the graphics 120 may change to correspond to the product selection icon 114. Upon a different product selection being made in the product selection user interface 102, the graphics 120 will change to correspond to the different product selection. For example, upon a subsequent selection of product selection icon 116, the graphics 120 will change to correspond to the product selection icon 116. Other graphics 120 may be used to indicate that a product has been selected from the product selection user interface 102.

Figure 5:
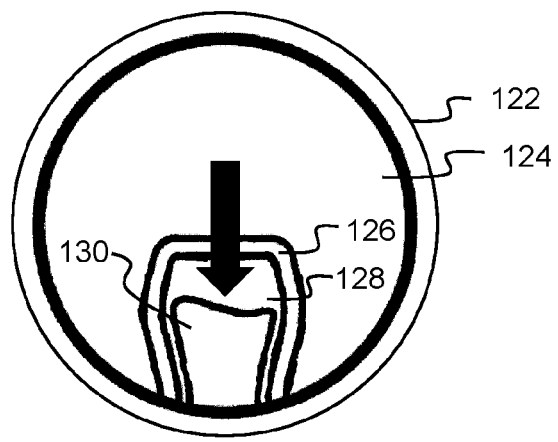
FIG. 5 illustrates a touch-to-pour user interface according to another aspect of the disclosure.

FIG. 5 illustrates a touch-to-pour (TTP) user interface 122 according to another aspect of the disclosure. The TTP user interface 122 can be used in place of the TTP user interface 104. Rather than having a display that can display graphics that correspond to a product selected on the product selection user interface 102, the TTP user interface 122 has a front surface 124 with one or more static graphics depicted thereon. For example, the static graphics may be painted, printed, affixed or otherwise placed on the front surface 124. A touch sensor is coupled to the front surface 124. The touch sensor may be a capacitive touch sensor, a resistive touch sensor, a strain gauge, a button, a switch, or any other device capable of detecting a touch while a user is touching the touch sensor surface.

The front surface may also have one or more areas 126, 128, 130 that may be illuminated from behind with a light emitting diode. Accordingly, a light emitting diode electronic module or other light emitting electronic module may be positioned behind the surface 124 so as to illuminate the one or more areas 126, 128, 130.

In some implementations different colors of light emitting diodes may provide illumination of a particular color to the areas 126, 128, 130. In some implementations, each of the areas 126, 128, 130 may be illuminated with a separate color based on a product selected in the product selection user interface 102. For example, upon selection of a lemon-lime beverage product with a raspberry flavor in the product selection user interface 102, such as upon selection of icon 114, the area 126 may be illuminated with a green light and the area 130 may be illuminated with a red light. Other colors and areas of illumination may be used.

Figure 6:
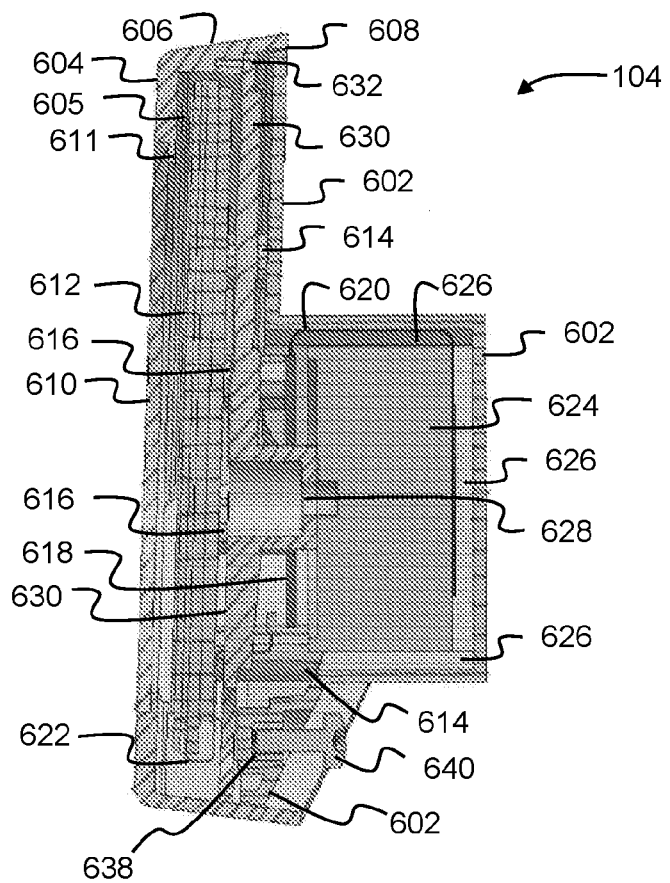
FIG. 6 illustrates a cross-sectional view of the touch-to-pour user interface according to various embodiments of the disclosure.

FIG. 6 illustrates a cross-sectional view of the TTP user interface 104 according to various embodiments of the disclosure. The TTP user interface 104 includes a back cover 602 coupled to a front cover 604 to form an enclosure 605 therebetween. The front cover 604 includes a flange 606 that extends away from a front surface of the front cover 604 towards the back cover 602. The front cover 604 is coupled to the back cover for relative motion therebetween by a flexible seal (not shown) at a point of intersection 608 between the back cover 602 and the flange 606 of the front cover 604. The flexible seal serves multiple purposes of allowing the front cover 604 to move relative to the back cover 602, affixing the front cover 604 to the back cover 602, and sealing the enclosure 605 from ambient conditions. For example, when the product dispenser 100 is a beverage dispenser, the flexible seal prevents liquids from entering the enclosure 605. Any seal and/or adhesive with a sufficient durometer to allow motion of the front cover 604 to move relative to the back cover 602 at frequencies of haptic feedback vibrations, such as between 10 and 500 Hz, may be used.

The front cover 604 and the back cover 602 may be made of any material. In some implementations, the front cover 604 and the back cover 602 may be injection molded parts. In some implementations, the front cover 604 may be a stamped metal piece to provide a more rigid component than an injected molded part for more efficient transfer of the haptic feedback vibrations.

The front cover 604 includes a transparent viewing portal 610 that provides a viewing window to view a display electronic module 612. The display electronic module 612 may be a liquid crystal display, an organic liquid crystal display, a quantum dot liquid crystal display, or a plasma display.

The viewing portal 610 is affixed to the front cover 604 along a flange 611 that extends from the front cover 604 towards a center of the front cover 604 along a perimeter of the viewing portal 610. The viewing portal 610 may be affixed to the flange 611 by adhering, gluing, laser welding, screwing, or otherwise affixing the viewing portal 610 to the flange 611. One or more seals may be present between the viewing portal 610 and the front cover 604 and/or flange 611. Regardless of how the viewing portal 610 is affixed to the front cover 604, the integrity of the enclosure 605 is maintained. For example, when the product dispenser 100 is a beverage dispenser, the viewing portal 610 is affixed to the front cover 604 to prevent any liquids from entering the enclosure 605. The viewing portal 610 may have masking, such as a black painted strip, along the circumference of the viewing portal 610 at the location of the flange 611 so as to hide the flange 611 from view through the viewing portal 610.

The display electronic module 612 is affixed to the back cover 602 via a plurality of bosses 614 that extend therebetween. The bosses 614 maintain the display electronic module 612 in a fixed position relative to the back cover 602. The display electronic module 612 may also have a plurality of bosses 616 that extend towards the back cover 602 and affix a printed circuit board (PCB) 618 in a fixed position relative to the display electronic module 612.

The PCB 618 is electrically coupled to a control cable 620 for supplying control signals and/or power to a haptic feedback driver 624. The PCB 618 is also electrically coupled to a control cable 622 for supplying control signals and/or power to drive the operation of the display electronic module 612. The PCB 618 is also electrically coupled to a central control cable for receiving central control signals and/or power from a controller (not shown) of the product dispenser 100. For example, the PCB 618 receives central control signals from the controller of the product dispenser 100 for displaying the graphics 120 on the display electronic module 612. The PCB 618 also receives central control signals from the controller of the product dispenser 100 for controlling the haptic feedback driver 624 to produce haptic feedback on the TTP user interface 104.

The PCB 618 may also be electrically coupled to one or more other electronics in the TTP user interface 104, such as a touch sensor (not shown) for sensing a touch on the viewing portal 610 or one or more buttons placed on the front cover 604. The touch sensor may be a capacitive touch sensor, a resistive touch sensor, a strain gauge, a button, a switch, or any other device capable of detecting a touch while a user is touching the viewing portal 610 or the front cover 604.

In some implementations, the display electronic module 612 is a capacitive touchscreen display. In such implementations, the sensitivity of the touchscreen display may be adjusted to permit detection of a touch on the viewing portal 610. At the same time, the touchscreen display is spaced sufficiently apart from the viewing portal 610 that the touch does not result in the display electronic module 612 being touched by the viewing portal 610 or front cover 604.

The PCB 618 provides feedback to the controller of the product dispenser 100 upon detecting a touch to control operation of the product dispenser 100. For example, upon receiving the feedback from the PCB 618 that a touch has been detected, the controller of the product dispenser 100 may operate to dispense a product. Likewise, upon receiving the feedback from the PCB 618 that a touch has been detected, the product dispenser 100 may provide control signals to the PCB 618 to cause the haptic feedback driver 624 to produce haptic feedback on the TTP user interface 104. In other words, the haptic feedback driver 624 is conditioned such that haptic feedback is provided to the TTP user interface 104 while a touch is detected. When a touch is no longer detect, the haptic feedback is stopped.

The haptic feedback driver 624 may be affixed to the back cover 602 with foam tape 624. In some implementations, more than one side of the haptic feedback driver 624 may be affixed to the back cover 602 with the foam tape 624. The foam tape 624 maintains the haptic feedback driver 624 at a fixed location relative to the back cover 602 and isolates any vibrations from the haptic feedback driver 624 from traveling to the back cover 602.

The haptic feedback driver 624 drives a haptic feedback actuator 628 to produce haptic feedback. The haptic feedback driver 624 and the haptic feedback actuator 628 may collectively be referred to as a haptic feedback transducer. The haptic feedback transducer may be a linear resonant actuator, an eccentric rotating mass, or a piezoelectric actuator. The haptic feedback transducer produces patterns of vibration waves or pressure waves to provide haptic feedback. The haptic feedback transducer may produce patterns of air vortices. For example, when the haptic feedback transducer is a linear resonant actuator (LRA), the haptic feedback driver 624 may comprise a magnetic coil configured to drive a linear feedback actuator 628 along an axis of vibration. In the orientation shown in FIG. 6, the axis of vibration is an axis that extends from the front cover 604 to the back cover 602.

In some implementations, when the haptic feedback transducer is a LRA, the LRA may also be driven to act a speaker for the product dispenser 100. That is, in addition to being driven at frequencies and patterns that provide haptic feedback, the LRA may be driven at frequencies and patterns to provide auditory feedback to a user. In such an implementations, the front cover 604 vibrates with the auditory feedback in a manner to produce auditory sound waves. The LRA may only be driven with auditory feedback when a touch is not detected by the TTP user interface 104. If auditory feedback is being provided, upon detecting a touch, the auditory feedback is stopped.

The haptic feedback actuator 628 is coupled to a transfer plate 630, which in turn is coupled to the front cover 604. For example, the transfer plate 630 may be glued, adhered, screwed, or otherwise affixed to the front cover 604 to prevent relative motion therebetween. The transfer plate may be an injection molded part or stamped metal part. As shown in FIG. 6, the transfer plate 630 is coupled to a back surface of the flange 606 of the front cover 604 at a connection point 632. The transfer plate 630 may include one or more protrusions along the axis of vibration that extend into the back surface of the flange 606. In this way, the haptic feedback produced on the haptic feedback actuator 628 is transferred by the transfer plate 630 to the front cover 604. Because the viewing portal 610 is affixed to the front cover 604, the haptic feedback is likewise transferred to the viewing portal 610. As shown in FIG. 6, all of the parts of the TTP user interface 104 with horizontal hashing are fixed parts that do not move during operation of the haptic feedback actuator 628. All of the parts with the diagonal hashing vibrate with the haptic feedback produced by the haptic feedback actuator 628.

Figure 7:
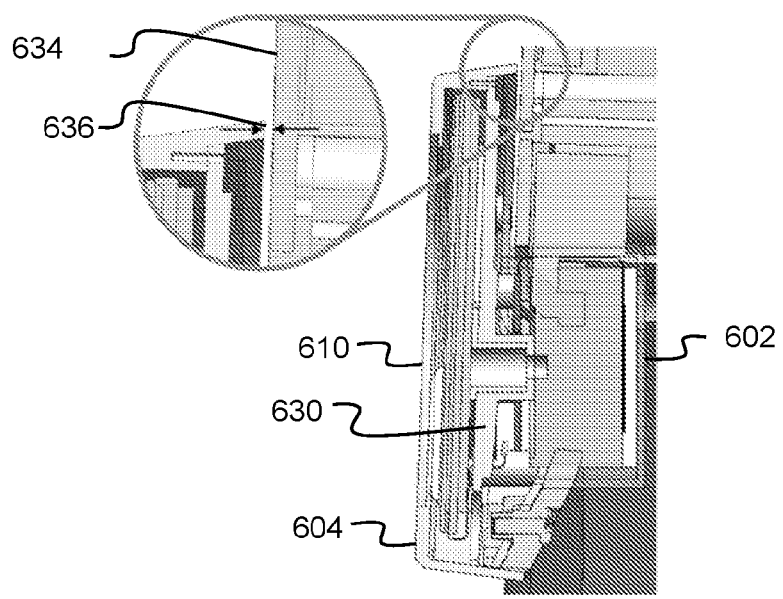
FIG. 7 illustrates a cross-sectional view of the touch-to-pour user interface coupled to the product dispenser according to various embodiments of the disclosure.
Figure 8:
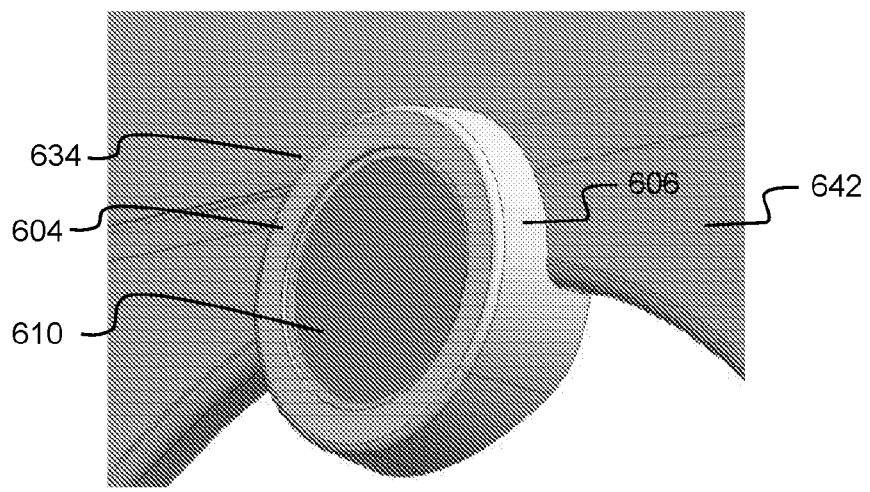
FIG. 8 illustrates a front perspective view of the of the touch-to-pour user interface coupled to the product dispenser according to various embodiments of the disclosure.
Figure 9:
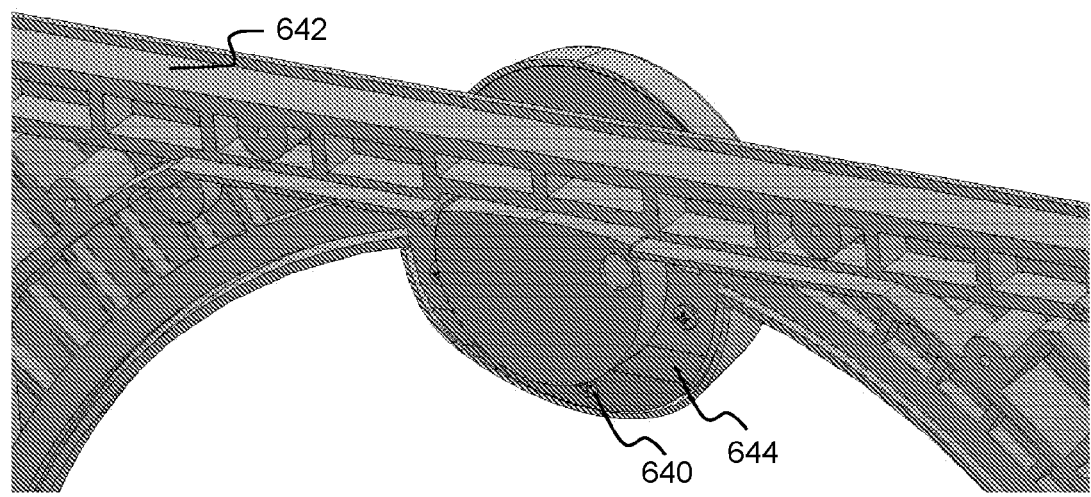
FIG. 9 illustrates a rear perspective view of the touch-to-pour user interface coupled to the product dispenser according to various embodiments of the disclosure.

FIGS. 7-9 illustrate views of the TTP user interface 104 coupled to the product dispenser 100 according to various embodiments of the disclosure. When the TTP user interface 104 is coupled to the product dispenser 100, the back cover 602 may be affixed to a frame 642 of the product dispenser 100. The frame 642 includes an area 644 with an opening therein sized and shaped to receive at least a portion of the back cover 602 therethrough. Screws 640 extend through the frame 642 and affix to threaded mounting holes 638 (best shown in FIG. 6) on the back cover 602. In this way, the back cover 602 is rigidly fixed to the frame 642 of the product dispenser 100.

When the TTP user interface 104 is coupled to the product dispenser 100, a surface 634 of the product dispenser 100 may be in close proximity to the front cover 604, such that a narrow gap 636 is formed therebetween. Because the back cover 602 is fixed to the frame 642 of the product dispenser 100, and the front cover 604 moves relative to the back cover 602, then the front cover 604 likewise moves relative to the product dispenser 100. In order to prevent the front cover 604 from rattling against the surface 634 of the product dispenser 100 while haptic or auditory feedback is being provided, a compressible and flexible gasket may be provided between a back surface of the front cover 604 and the surface 634 of the product dispenser 100. The gasket between the front cover 604 and the surface 634 of the product dispenser allows the front cover 604 to vibrate with the auditory or haptic feedback while at the same time preventing the front cover 604 from making contact with the surface 634 of the product dispenser 100. Therefore, even when a user is touching the viewing portal 610 on the TTP user interface 104, the front cover 604 does not make contact with the surface 634 of the product dispenser.

Figure 10:
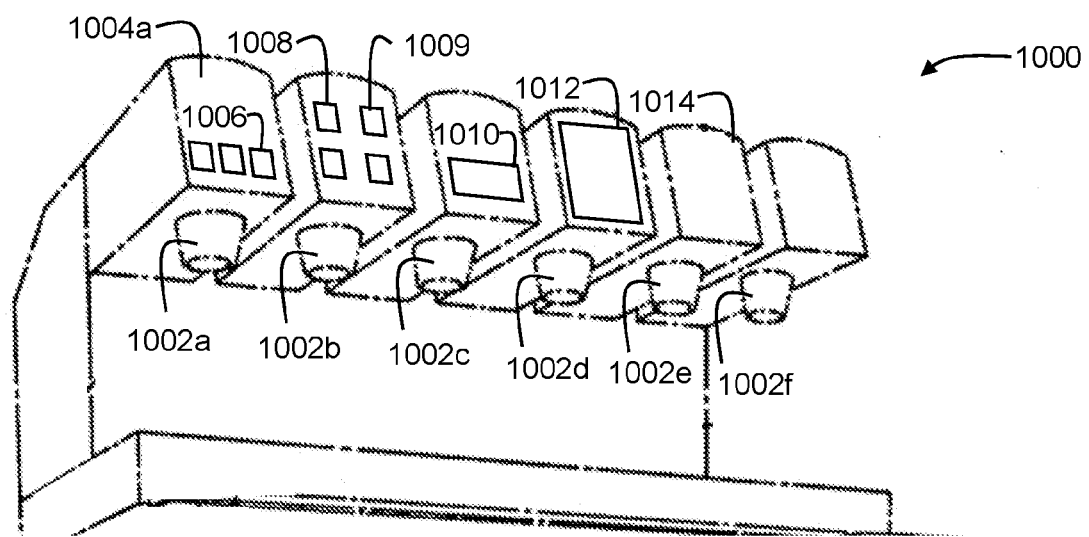
FIG. 10 illustrates an exemplary product dispenser with a plurality of nozzles according to various embodiments of the disclosure.

FIG. 10 illustrates an exemplary product dispenser 1000 according to various embodiments of the disclosure. In contrast to the product dispenser 100, which has a single nozzle for dispensing a variety of products, the product dispenser 1000 has a plurality of nozzles 1002a-e, collectively or plurally referred to as nozzles 1002. Some of the nozzles 1002, such as nozzles 1002a and 1002c, may be single product nozzles and others may be multi-product nozzles 1002, such as nozzle 1002b. When the product dispenser 1000 is a beverage dispenser, single product nozzles are single product valves and the multi-product nozzles 1002 are multi-flavor valves. The nozzles 1002 have front surfaces 1004, such as front surface 1004a, that acts as a touch surface. Each of the front surfaces 1004 includes a touch sensor.

On various ones of the front surfaces, the touch sensor is a button, such as a portion control size button 1006, a product selection button 1008, or a dispense button 1010. The touch sensor may also be a touchscreen or a touch sensitive display 1012 as described above. For example, the touch sensitive display 1012 may be a display or touchscreen display housed behind a transparent viewing portal surface. The touch sensor may also simply be touch sensor affixed to the front surface 1014. For example, the front surface 1014 may have printed graphics or a placard of the product to be dispensed from the nozzle 1002e. A touch sensor may be affixed to a rear side of the front surface 1014. The touch sensor may be a capacitive touch sensor, a resistive touch sensor, a strain gauge, or any other device capable of detecting a touch while a user is touching the front surface 1014. Other variations of touch sensors may be used. While different touch sensors are shown on various ones of the nozzles 1002, it is contemplated that a plurality of the nozzles would utilize the same type of touch sensors.

Figure 11:
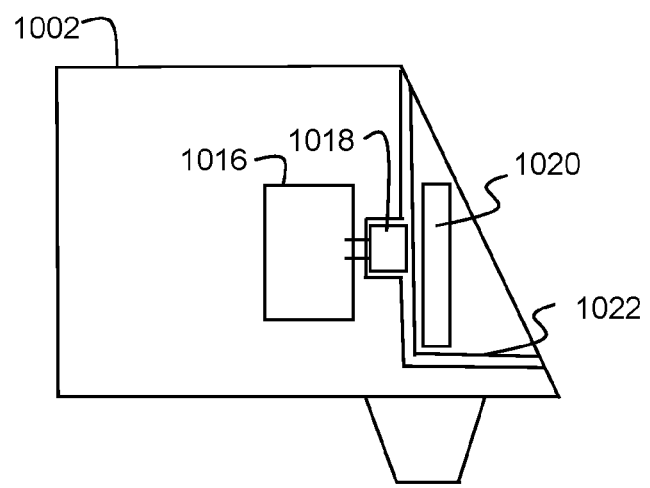
FIG. 11 illustrates a cross-sectional view of one of the plurality of nozzles according to various embodiments of the disclosure.

FIG. 11 illustrates a cross-sectional view of one of the plurality of nozzles 1002 according to various embodiments of the disclosure. As with the TTP user interface 104 described above, the nozzle 1002 includes a haptic feedback driver 1016 and haptic feedback actuator 1018. The haptic feedback driver 1016 drives the haptic feedback actuator 1018 to provide haptic feedback on the front surface of the nozzle 1002 while a touch is detected. An electronics module 1020, such as a printed circuit board for controlling and detecting one or more buttons, a light emitting electronic module, or a display electronic module, is positioned between the haptic feedback actuator 1018 and the front surface of the nozzle 1002. A transfer plate 1022 is coupled to the haptic feedback actuator 1018 and extends around the electronics module 1020 to provide haptic feedback to the front surface of the nozzle 1002. Therefore, while detecting a touch, the nozzle 1002 is able to provide haptic feedback to the front surface.

For multi-product nozzles, the haptic feedback actuator 1018 is able to provide different patterns of haptic feedback depending on which product is being dispensed. Therefore, different patterns of haptic feedback may be provided to the front surface of the nozzle 1002 depending on which area is selected on the front surface of the nozzle 1002. For example, While selecting button 1008 on a first area of the front surface of the multi-product nozzle 1002b, the haptic feedback actuator 1018 may provide a first pattern of haptic feedback. While selecting button 1009 on a second area of the front surface of the multi-product nozzle 1002b, the haptic feedback actuator 1018 may provide a second pattern of haptic feedback.

Providing haptic feedback in the manner described above for other variations of touch-to-operate devices is contemplated by this disclosure.

Figure 12:
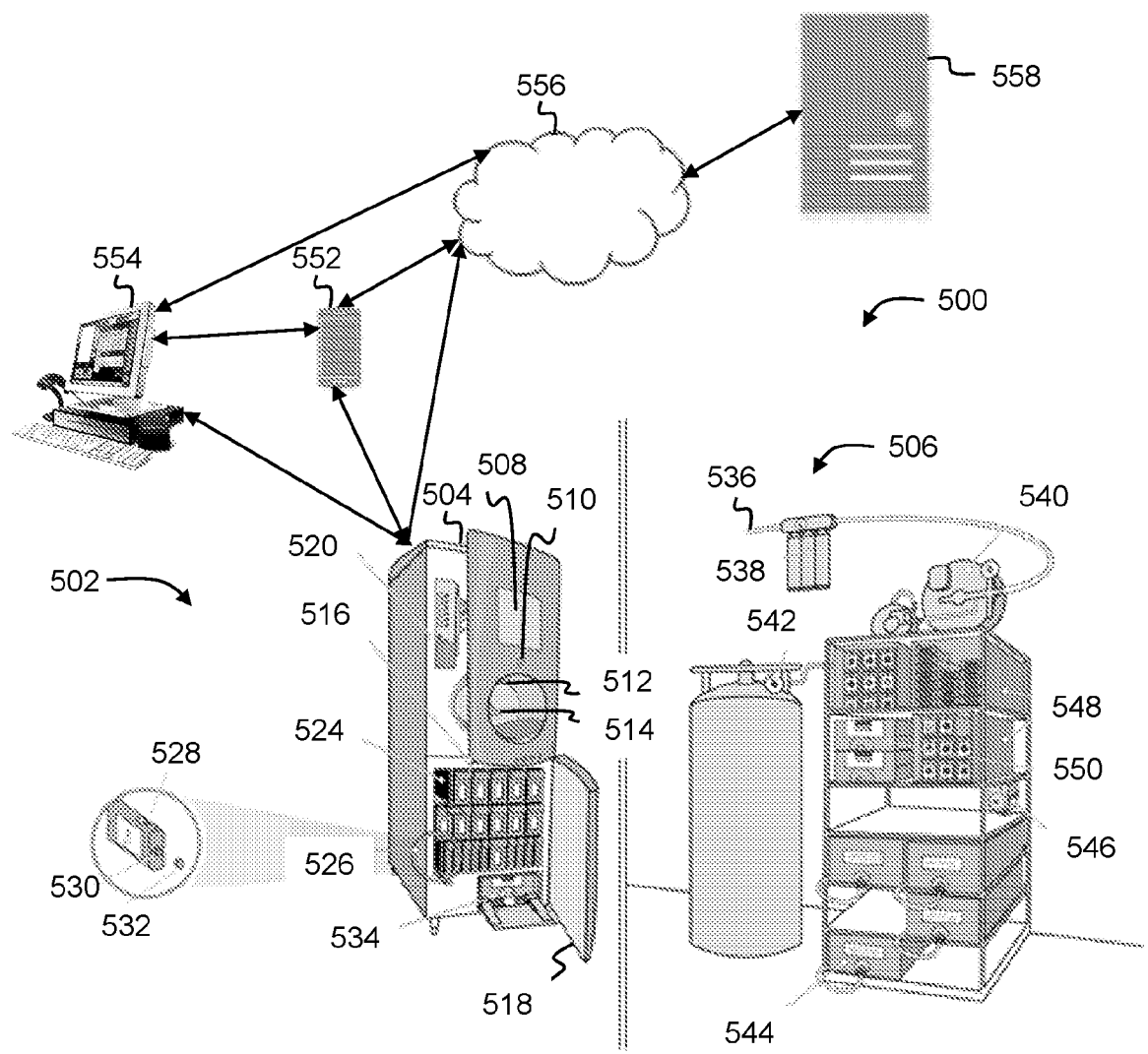
FIG. 12 illustrates an exemplary beverage dispenser system suitable for implementing the several embodiments of the disclosure.

FIG. 12 illustrates an exemplary beverage dispenser system 500 suitable for implementing the several embodiments of the disclosure. As shown, the beverage dispenser system 500 is configured as an ice cooled beverage dispenser. Other configurations of beverage dispensers are contemplated by this disclosure such as a drop-in ice-cooled beverage dispenser, a counter electric beverage dispenser, a remote recirculation beverage dispenser, or any other beverage dispenser configuration.

The beverage dispenser system 500 includes a front room system 502 with a beverage dispenser 504 and a back room system 506. The beverage dispenser 504 includes a user interface 508, such as a touchscreen display, to facilitate selection of the beverage to be dispensed. The user interface 508 may employ various screens to facilitate user interactions on the beverage dispenser 504 and/or receive a user profile through interaction with a user's mobile device 552, such as described in commonly owned U.S. patent application Ser. No. 14/485,826, entitled "Product Categorization User Interface for a Dispensing Device," which is herein incorporated by reference in its entirety. User interface 508 corresponds with the product selection user interface 102 described above.

Upon receiving a beverage selection via the user interface 508, a pour button 510 may be activated to dispense the selected beverage from the beverage dispenser 504 via a nozzle 514. For example, the pour button 510 may be an electromechanical button, capacitive touch button, or other button selectable by a user to activate the beverage dispenser 504 to dispense a beverage. While shown as a button, the pour button 510 may alternatively be implemented as a lever or other mechanism for activating the beverage dispenser 504 to dispense a beverage. As shown in FIG. 12, the pour button 510 is separate from the user interface 508. In some implementations, the pour button 510 may be implemented as a selectable icon in the user interface 508. The pour button 510 corresponds with the TTP user interface 104 described above.

In some implementations, the beverage dispenser may also include an ice lever 514. Upon being activated, the ice lever 514 may cause the beverage dispenser 504 to dispense ice through an ice chute (not shown). For beverage dispensers that do not have an ice bin, such as counter-electric or remote recirculation beverage dispensers, the ice lever 514 may be omitted.

The beverage dispenser 504 may be secured via a primary door 516 and an ingredient door 518. The primary door 516 and the ingredient door 518 may be secured via one or more locks. In some implementations, the locks are a lock and key. In some implementations, the lock on the ingredient door 518 may be opened via an RFID reader (not shown) reading an authorize ingredient package 528. The primary door 516 may secure electronic components of the beverage dispenser 504 including one or more controllers 520. The ingredient door 518 may secure an ingredient compartment that houses an ingredient matrix 524.

The ingredient matrix 524 includes a plurality of slots 526 for receiving ingredient packages 528. In various implementations, the ingredient packages 528 may be micro-ingredient cartridges. The micro-ingredient cartridges may be single cartridges or double cartridges, such as described in commonly owned U.S. patent application Ser. No. 14/209,684, entitled "Beverage Dispenser Container and Carton," and U.S. patent application Ser. No. 12/494,427, entitled "Container Filling Systems and Methods," which are both herein incorporated by reference in their entirety. As shown in FIG. 12, there are three drawers of ingredients in the ingredient matrix 524. One or more of the drawers may slide back and forth along a rail so as to periodically agitate the ingredients housed on the drawer. Other configurations of the ingredient matrix 524 are possible, such as via one or more static and/or agitated ingredient towers.

Each ingredient package 528 may comprise an RFID tag, a fitment 530, and a fitment seal 532. The fitment seal 532 may be removed prior to installation into the beverage dispenser 504. Upon installation, the fitment 530 may engage with and provide a fluidic communication between a probe (not shown) in the slot 526 and the ingredients contained in the ingredient package 528. The ingredient matrix 524 may also contain one or more large volume micro-ingredient packages 534, such as for one or more micro-ingredient sweetener sources.

The beverage dispenser 504 may also include a carbonator (not shown) for receiving water and carbon dioxide to produce carbonated water. The beverage dispenser 504 may also include one or more heat exchangers (not shown), such as a cold plate, for cooling one or more of the beverage ingredients contained in or received by the beverage dispenser 504. In some implementations, one or more of the micro-ingredients dispensed via the nozzle 512 are not cooled via the heat exchanger or are otherwise maintained at an ambient temperature. Macro-ingredients dispensed via the nozzle 512 are typically cooled via the heat exchanger prior to being dispensed.

The back room system 506 is typically located in a back room remote from the front room system 502, such as a storage area in a merchant location. The back room system 506 includes a water source 536 such as a municipal water supply that provides a pressurized source of plain water. The water received via the water source 536 may be filtered or otherwise treated by a water treatment system 538. The treated water may optionally be pressurized to a desired pressure with a water booster 540 and supplied to the beverage dispenser. A carbon dioxide source 542 may supply carbon dioxide to the beverage dispenser 504.

One or more macro-ingredient sources 544 may be located in the back room. The macro-ingredient from each macro-ingredient source 544 may be supplied to the beverage dispenser 504 via a pump 546. The pump 546 may be a controlled gear pump, diaphragm pump, BIB pump, or any other suitable pump for supplying macro-ingredients to the beverage dispenser 504. The back room system 506 may also include a rack with one or more storage locations 548 for spare micro-ingredients and one or more storage locations 550 for spare macro-ingredients.

The beverage dispenser 504 may include one or more network interfaces for communicating directly with devices in the front room or the back room, communicating with devices in the front room or the back room in a local area network (LAN), or communicating with devices remote from a location with the beverage dispenser system 500 via a wide area network (WAN) connection. For example, the beverage dispenser 504 may include networking devices such as a near field communication (NFC) module, a BLUETOOTH module, a WiFi module, a cellular modem, an Ethernet module, and the like. The beverage dispenser 504 may communicate via a direct communication or via a LAN with a user's mobile device 552 or a point-of-sale (POS) device 554 to receive a beverage selection or user profile of a user for configuring the beverage dispenser 504 to dispense one or more beverages based on the beverage selection or user profile. The user profile may include stored favorite beverages for the user, mixed or blended beverages created or stored by the user in their profile, and/or one or more beverage preferences, such as preferred nutritive level. The beverage dispenser 504 may also communicate via a WAN 556 for communicating with one or more remote servers 558 to receive software updates, content updates, user profiles, or beverage selections made via the remote server 558.

Figure 13:
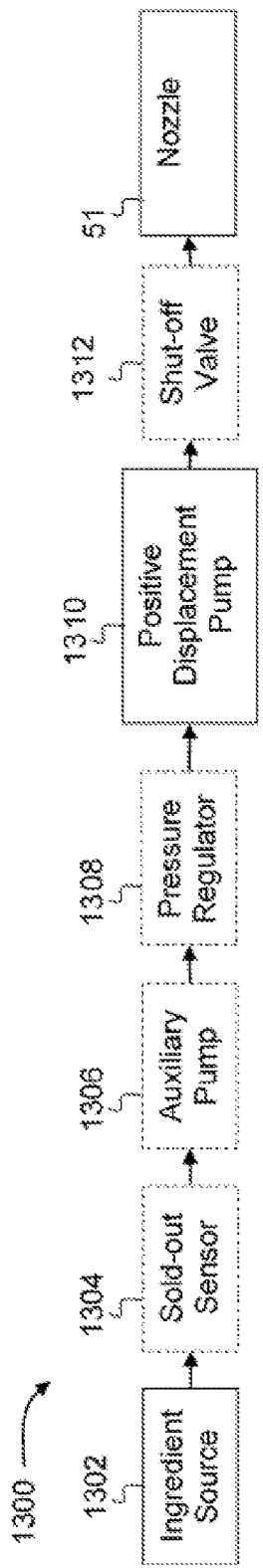
FIG. 13 illustrates an exemplary fluidic circuit with a positive displacement pump suitable for implementing the several embodiments of the disclosure.
Figure 14:
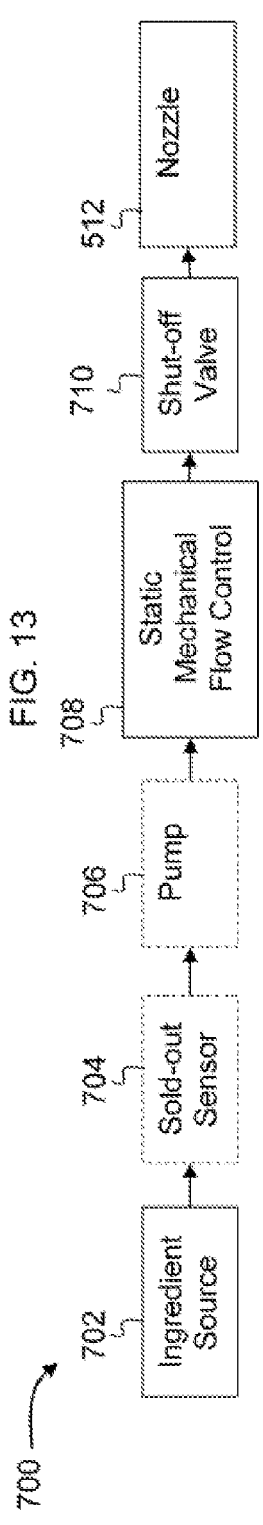
FIG. 14 illustrates an exemplary fluidic circuit with a static mechanical flow control suitable for implementing the several embodiments of the disclosure.
Figure 15:
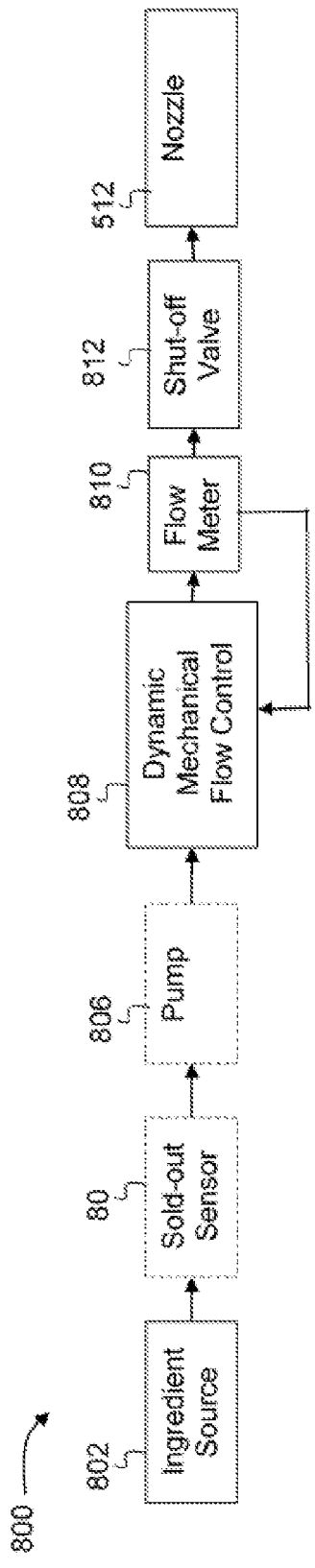
FIG. 15 illustrates an exemplary fluidic circuit with a dynamic mechanical flow control and flow meter suitable for implementing the several embodiments of the disclosure.

FIGS. 13-15 illustrate exemplary fluidic circuits 1300, 700, 800 with pumping or metering devices from ingredient sources 1302, 702, 802 to the nozzle 512 of the beverage dispenser 504. The beverage dispenser 504 may include none, one, or a plurality of the fluidic circuits shown in FIGS. 13-15. For each ingredient source, the beverage dispenser 504 may include one of the fluidic circuits shown in FIGS. 13-15.

FIG. 13 illustrates an exemplary fluidic circuit 1300 with a positive displacement pump 1310 suitable for implementing the several embodiments of the disclosure. The fluidic circuit 1300 provides a fluid path from the ingredient source 1302 to the nozzle 512. The ingredient source 1302 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The positive displacement pump 1310 may meter a predetermined volume or flow rate of ingredient from the ingredient source 1302 to the nozzle 512. The positive displacement pump 1310 may be a piston pump, controlled gear pump, peristaltic pump, nutating pump, diaphragm pump, or other such positive displacement pump for metering a fixed volume of flow rate of a fluid with each cycle of the pump.

The fluidic circuit 1300 may optionally include a sold-out sensor 1304 for detecting when the ingredient source 1302 is empty. When the ingredient source 1302 is remotely located from the beverage dispenser 504, the fluidic circuit 1300 may also optionally include an auxiliary pump 1306 for providing a pressurized supply of the beverage ingredient to the beverage dispenser 504. Within or immediately adjacent to the beverage dispenser 504, the fluidic circuit 1300 may include a pressure regulator 1308 such that the inlet of the positive displacement pump 1310 receives a lower or zero pressure supply of beverage ingredient. The fluidic circuit 1300 may also optionally include a shut-off valve 1312 that is configured to remain closed when an ingredient is not being dispensed so as to prevent beverage ingredient from dripping from the nozzle 512.

FIG. 7 illustrates an exemplary fluidic circuit 700 with a static mechanical flow control 708 suitable for implementing the several embodiments of the disclosure. The static mechanical flow control 708 receives a pressurized beverage ingredient from an ingredient source 702 and provides a fixed flow rate of the beverage ingredient to the nozzle 512. The static mechanical flow control 708 may be calibrated with a set screw for configuring the flow rate of the static mechanical flow control 708. A shut-off valve 710 downstream of the static mechanical flow control 708 may be actuated to open and close in order to dispense or prevent dispensing the beverage ingredient from the nozzle 512.

The ingredient source 702 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The ingredient source 702 may also be the municipal water supply 536 or other pressurized ingredient source. When the ingredient source 702 is not pressurized, the fluidic circuit 700 may include a pump 706 for pressurizing the beverage ingredient from the ingredient source 702. The pump 706 may be any pump suitable for pressurizing the beverage ingredient from the ingredient source 702, such as a BIB pump, $CO_2$ driven pump, controlled gear pump, or positive displacement pump. The fluidic circuit 700 may also optionally include a sold-out sensor 704 for detecting when the ingredient source 702 is empty.

FIG. 8 illustrates an exemplary fluidic circuit 800 with a dynamic mechanical flow control 808, a flow meter 810, and a shut-off valve 812 suitable for implementing the several embodiments of the disclosure. The dynamic mechanical flow control 808 receives a pressurized beverage ingredient from an ingredient source 802 and provides an adjustable flow rate of the beverage ingredient to the nozzle 512. The dynamic mechanical flow control 808 may include a variable sized orifice that adjusts to dynamically change the flow rate of the beverage ingredient supplied to the nozzle 512 based on control signals provided by the one or more controllers 520. A flow meter 810 downstream of the dynamic mechanical flow control 808 measures a flow rate of the beverage ingredient being supplied by the dynamic mechanical flow control 808 and provides a feedback loop to the dynamic mechanical flow control 808 for controlling the variable sized orifice. A shut-off valve 812 downstream of the dynamic mechanical flow control 808 may be actuated to open and close in order to dispense or prevent dispensing the beverage ingredient from the nozzle 512.

The ingredient source 802 may be a micro-ingredient source or a macro-ingredient source housed in the ingredient matrix 524 of the beverage dispenser 504, remote from the beverage dispenser 504 in the front room (e.g., adjacent to the beverage dispenser 504 or under a counter on which the beverage dispenser 504 is located), or located in the back room. The ingredient source 802 may also be the municipal water supply 536 or other pressurized ingredient source. When the ingredient source 802 is not pressurized, the fluidic circuit 800 may include a pump 806 for pressurizing the beverage ingredient from the ingredient source 802. The pump 806 may be any pump suitable for pressurizing the beverage ingredient from the ingredient source 802, such as a BIB pump, $CO_2$ driven pump, controlled gear pump, or positive displacement pump. The fluidic circuit 800 may also optionally include a sold-out sensor 804 for detecting when the ingredient source 802 is empty.

While the components of the fluidic circuits 1300, 700, 800 are shown in a particular order in FIGS. 13-15, any order of the components described above may be used. For example, the shut-off valve 812 may be upstream of the flow meter 810. Other variations are readily recognizable by those of ordinary skill in the art. Additionally, one or more heat exchangers (not shown) may be used at any location in the fluidic circuits of FIGS. 13-15. The heat exchanger may include an ice bin, water bath, cold plate, or remote recirculation system.

Figure 16:
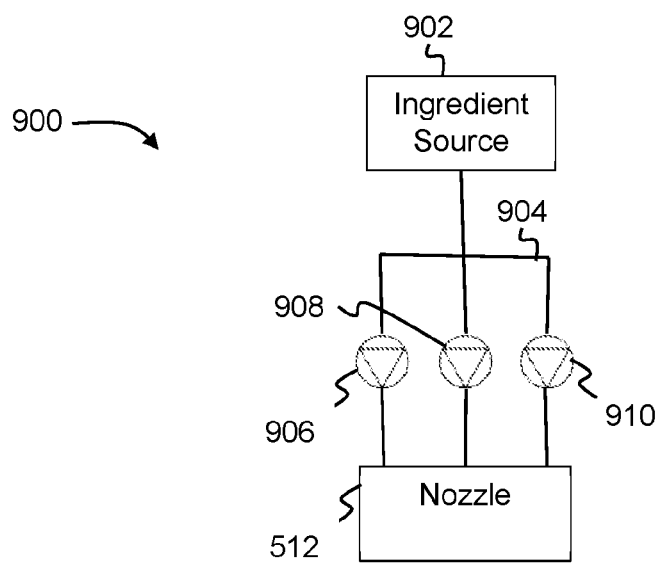
FIG. 16 illustrates an exemplary fluidic circuit with a plurality of independently controlled paths from a single ingredient source suitable for implementing the several embodiments of the disclosure.

FIG. 16 illustrates an exemplary fluidic circuit 900 with a plurality of independently controlled paths from a single ingredient source 902 to the nozzle 512 suitable for implementing the several embodiments of the disclosure. The fluidic circuit 900 includes a manifold 904 for supplying beverage ingredient to each of the independently controlled paths. Each path includes a pumping or metering device 906, 908, 910 for supplying beverage ingredient from the ingredient source 902 to the nozzle 512. The pumping or metering devices 906, 908, 910 may be configured as any of the fluidic circuits 1300, 700, 800 shown in FIGS. 13-15. By having multiple independent paths from the ingredient source 902 to the nozzle 512, a larger range of flow rates are possible than using any one of the pumping or metering devices 906, 908, 910. For example, for a first flow rate of beverage ingredient from the ingredient source, only one of the pumping or metering devices 906, 908, 910 may be activated. For a second flow rate of the beverage ingredient from the ingredient source, a plurality of the pumping or metering devices 906, 908, 910 may be activated.

Figure 17:
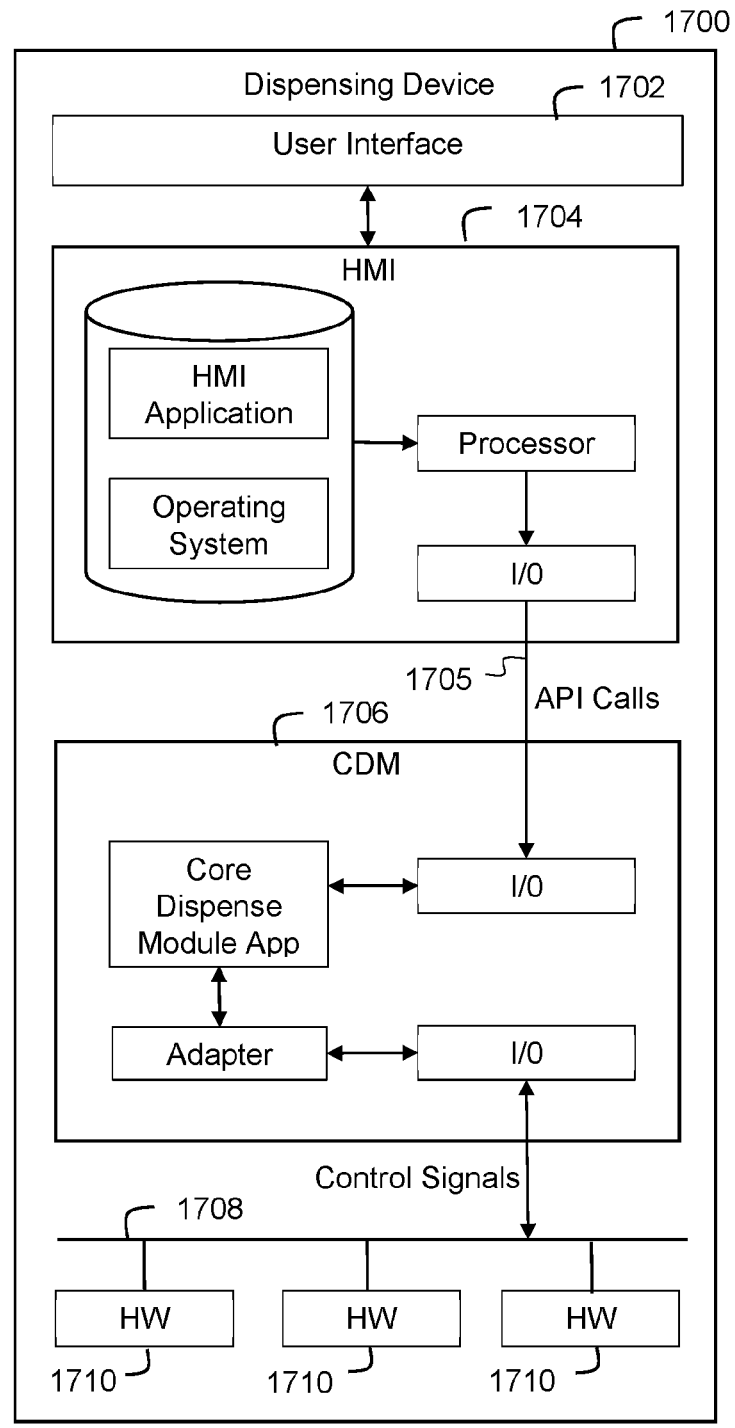
FIG. 17 illustrates an exemplary block diagram of a control architecture for a beverage dispenser suitable for implementing the several embodiments of the disclosure.

FIG. 17 illustrates an exemplary block diagram of a control architecture 1700 that may be used to control the beverage dispenser 504 suitable for implementing the several embodiments of the disclosure. As shown in FIG. 17, control architecture 1700 may comprise a core dispense module (CDM) 1706, a human machine interface (HMI) module 1704, a user interface (UI) 1702, and a machine bus (MBUS) 1705. HMI 1704 may connect to or otherwise interface and communicate with at least one external device (e.g., mobile device 552 or POS 554) being external to beverage dispenser 504. HMI 1704 may also control and update display screens on UI 1702. CDM 1706 may control flows from a plurality of pumps and/or valves 1710 in beverage dispenser 504 according to a recipe to mix and dispense a product (e.g., a beverage) from beverage dispenser 504.

Beverage ingredients (e.g., micro-ingredients, macro-ingredients, and/or diluents) may be combined to dispense various products that may include beverages or blended beverages (i.e., finished beverage products) from beverage dispenser 504. However, beverage dispenser 504 may also be configured to dispense beverage components individually.

An example of control architecture 1700 for beverage dispenser 504 may be described in U.S. Ser. No. 61/987,020, entitled "Dispenser Control Architecture", filed on May 1, 2014, the entirety of which is hereby incorporated by reference. MBUS 1705 may facilitate communication between HMI 1704 and CDM 1706 via one or more API calls. HMI 1704, MBUS 1705, and CDM 1706 may collectively comprise common core components, implemented as hardware or as combination of hardware and software, which may be adapted to provide customized functionality in beverage dispenser 504. Beverage dispenser 504 may further include memory storage and a processor. Examples of UI 1702 may be described in U.S. Ser. No. 61/877,549, entitled "Product Categorization User Interface for a Dispensing Device", filed on Sep. 13, 2013, the entirety of which is hereby incorporated by reference.

UI 1702 may detect what area of a touch screen has been touched by a user (e.g., user 108). In response, UI 1702 may send HMI 1704 data regarding where the touch screen was touched. In response, HMI 1704 may interpret this received data to determine whether to have UI 1702 display a different UI screen or to issue a command to CDM 1706. For example, HMI 1704 may determine that the user touched a portion of the touch screen corresponding to a beverage brand. In response, HMI 1704 may issue a command to CDM 1706 to ready to pour the corresponding beverage brand. In response to receiving a command to pour the corresponding beverage brand, for example upon detecting a touch on the TTP user interface 104, the CDM 1706 in turn issues commands via one or more control buses 1708 to the pumping or metering devices 1710 for the beverage ingredients needed to dispense the beverage brand. Or HMI 1704 may determine that the user touched a portion of the touch screen corresponding to a request for another screen. In response, HMI 1704 may cause UI 1702 to display the requested screen.

In some embodiments, UI 1702 in beverage dispenser 504 may be utilized to select and individually dispense one or more beverages. The beverages may be dispensed as beverage components in a continuous pour operation whereby one or more selected beverage components continue to be dispensed while a pour input is actuated by a user or in a batch pour operation where a predetermined volume of one or more selected beverage components are dispensed (e.g., one ounce at a time). UI 1702 may be addressed via a number of methods to select and dispense beverages. For example, a user may interact with UI 1702 via touch input to navigate one or more menus from which to select and dispense a beverage. As another example, a user may type in a code using an onscreen or physical keyboard (not shown) on beverage dispenser 504 to navigate one or more menus from which to select and dispense a beverage. As a further example, a user may interact with the HMI 1704 via a user interface of an application on the mobile device 552.

UI 1702, which may include a touch screen and a touch screen controller, may be configured to receive various commands from a user (i.e., consumer input) in the form of touch input, generate a graphics output and/or execute one or more operations with beverage dispenser 504 (e.g., via HMI 1704 and/or CDM 1706), in response to receiving the aforementioned commands. A touch screen driver in HMI 1704 may be configured to receive the consumer or customer inputs and generate events (e.g., touch screen events) that may then be communicated through a controller to an operating system of HMI 1704.

Beverage dispenser 504 may be in communication with one or more external device (e.g., mobile device 552 or POS 554). In some embodiments, the communication between beverage dispenser 504 and the external device may be accomplished utilizing any number of communication techniques including, but not limited to, near-field wireless technology such as BLUETOOTH, Wi-Fi and other wireless or wireline communication standards or technologies, via a communication interface.

Figure 18:
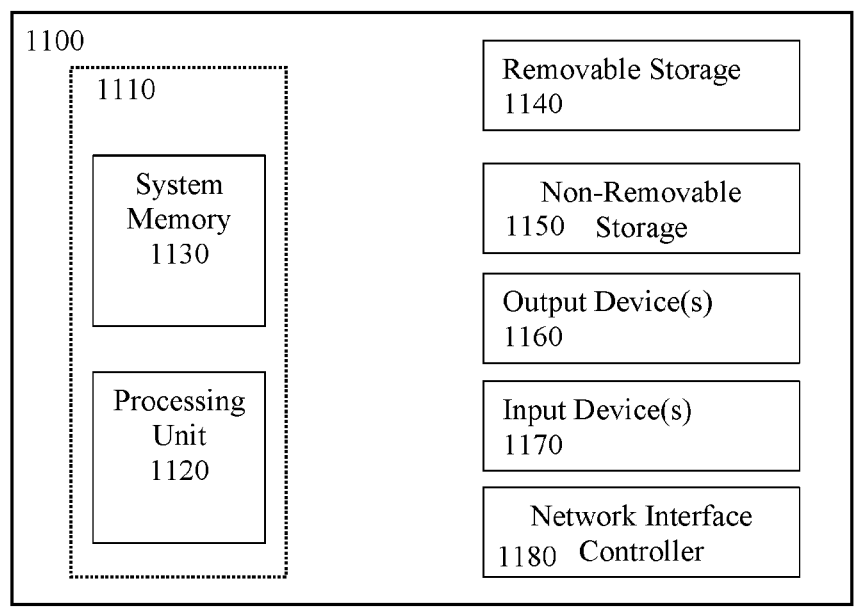
FIG. 18 illustrates an exemplary computer system suitable for implementing the several embodiments of the disclosure.

FIG. 18 illustrates an exemplary computer system 1170 suitable for implementing the several embodiments of the disclosure. For example, one or more components or controller components of the beverage dispenser 504 may be implemented as the computer system 1170. Similarly, one or more of the electronics modules may be implemented as the computer system 1170. In some implementations, one or both of the HMI 1704 and the CDM 1706 may be implemented as the computer system 1170.

It should be appreciated that the logical operations described herein with respect to the various figures may be implemented (1) as a sequence of computer implemented acts or program modules (i.e., software) running on a computing device (e.g., the computing device described in FIG. 18), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 18, an example computing device 1170 upon which embodiments of the invention may be implemented is illustrated. For example, each of the content source, key server, segmentations servers, caching servers, and client devices described herein may each be implemented as a computing device, such as computing device 1170. It should be understood that the example computing device 1170 is only one example of a suitable computing environment upon which embodiments of the invention may be implemented. Optionally, the computing device 1170 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In some embodiments, the computing device 1170 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In some embodiments, virtualization software may be employed by the computing device 1170 to provide the functionality of a number of servers that is not directly bound to the number of computers in the computing device 1170. For example, virtualization software may provide twenty virtual servers on four physical computers. In some embodiments, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 1170 typically includes at least one processing unit 1106 and system memory 1104. Depending on the exact configuration and type of computing device, system memory 1104 may be volatile (such as random access memory (RAM)), non-volatile (such as read-only memory (ROM), flash memory, etc.), or some combination of the two. This most basic configuration is illustrated in FIG. 18 by dashed line 1102. The processing unit 1106 may be a standard programmable processor that performs arithmetic and logic operations necessary for operation of the computing device 1170. While only one processing unit 1106 is shown, multiple processors may be present. Thus, while instructions may be discussed as executed by a processor, the instructions may be executed simultaneously, serially, or otherwise executed by one or multiple processors. The computing device 1170 may also include a bus or other communication mechanism for communicating information among various components of the computing device 1170.

Computing device 1170 may have additional features/ functionality. For example, computing device 1170 may include additional storage such as removable storage 1108 and non-removable storage 1110 including, but not limited to, magnetic or optical disks or tapes. Computing device 1170 may also contain network connection(s) 1116 that allow the device to communicate with other devices such as over the communication pathways described herein. The network connection(s) 1116 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/ or other air interface protocol radio transceiver cards, and other well-known network devices. Computing device 1170 may also have input device(s) 1114 such as a keyboard, keypads, switches, dials, mice, track balls, touch screens, voice recognizers, card readers, paper tape readers, or other well-known input devices. Output device(s) 1112 such as a printer, video monitors, liquid crystal displays (LCDs), touch screen displays, displays, speakers, etc. may also be included. The additional devices may be connected to the bus in order to facilitate communication of data among the components of the computing device 1170. All these devices are well known in the art and need not be discussed at length here.

The processing unit 1106 may be configured to execute program code encoded in tangible, computer-readable media. Tangible, computer-readable media refers to any media that is capable of providing data that causes the computing device 1170 (i.e., a machine) to operate in a particular fashion. Various computer-readable media may be utilized to provide instructions to the processing unit 1106 for execution. Example tangible, computer-readable media may include, but is not limited to, volatile media, non-volatile media, removable media, and non-removable media implemented in any method or technology for storage of information such as computer readable instructions, data structures, program modules or other data. System memory 1104, removable storage 1108, and non-removable storage 1110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1106 may execute program code stored in the system memory 1104. For example, the bus may carry data to the system memory 1104, from which the processing unit 1106 receives and executes instructions. The data received by the system memory 1104 may optionally be stored on the removable storage 1108 or the non-removable storage 1110 before or after execution by the processing unit 1106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

In the various embodiments and examples provided throughout the disclosure, the product dispenser may be a beverage dispenser or other food product dispenser. While the touch-to-pour user interface is described throughout the disclosure as associated with a product dispenser, the haptic feedback user interface can be used with any user interface for a device where a user is expected to maintain contact with the user interface while the device is in operation. Moreover, the haptic feedback user interface can adapt the pattern of haptic feedback provided to the user interface depending upon the mode of operation of the device. For example, the haptic feedback user interface can provide a first pattern of haptic feedback for a first mode of operation and a second pattern of haptic feedback for a second mode of operation. Accordingly, the touch-to-pour user interface described throughout this specification may be considered a touch-to-operate user interface and the produce dispenser may simply be considered a device configured to operate upon detecting a touch on the touch-to-operate user interface.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A product dispenser, comprising:
   a touch sensor configured to detect a selection on a first area of a surface of the product dispenser;
   a haptic feedback transducer coupled to the surface and configured to produce a pattern of haptic feedback to the surface while the touch sensor detects the selection on the first area of the surface; and
   a nozzle configured to dispense a product while the touch sensor detects the selection on the first area of the surface.

2. The product dispenser of claim 1, further comprising:
   a user interface configured to receive a selection of the product to be dispensed from the product dispenser.

3. The product dispenser of claim 2, wherein the user interface is one of: a touchscreen display, wherein the selection of the product to be dispensed is received upon detection by the touchscreen of selection of an icon of the product; a button, wherein the selection of the product to be dispensed is received upon depression of the button; or a lever, wherein the selection of the product to be dispensed is received upon articulation of the lever.

4. The product dispenser of any of claim 2, wherein the pattern of haptic feedback is based on the product.

5. The product dispenser of claim 4, wherein the haptic feedback transducer is configured to produce a second pattern of haptic feedback to the surface for a second product.

6. The product dispenser of claim 1, further comprising:
   a haptic feedback module, comprising:
      a back cover coupled to a frame of the product dispenser;
      a printed circuit board coupled to the back cover and positioned between the haptic feedback transducer and the surface; and
      a transfer plate coupled between the haptic feedback transducer and the surface and configured to transfer the pattern of haptic feedback from the haptic feedback transducer to the surface, wherein the transfer plate is not in contact with the back cover or printed circuit board.

7. The product dispenser of claim 6, wherein the printed circuit board is coupled to a boss that extends from the printed circuit board to the back cover, wherein the transfer plate comprises an aperture through which the boss extends.

8. The product dispenser of claim 7, wherein the surface is coupled to the back cover such that the surface is able to move relative to the back cover.

9. The product dispenser of claim 8, further comprising:
   a flexible seal between the surface and the back cover.

10. The product dispenser of claim 2, wherein the user interface is on the surface.

11. The product dispenser of claim 2, wherein the user interface is physically separate from the surface.

12. The product dispenser of claim 1, further comprising:
   a second touch sensor configured to detect a selection on a second area of the surface of the product dispenser, wherein the haptic feedback transducer is configured to produce the pattern of haptic feedback to the surface while either the touch sensor or the second touch sensor detects a selection on the first or second areas of the surface.

13. The product dispenser of claim 1, further comprising:
   a second touch sensor configured to detect a selection on a second area of the surface of the product dispenser, wherein the haptic feedback transducer is configured to produce a second pattern of haptic feedback to the surface while the second touch sensor detects a selection on the second area of the surface.

14. A haptic feedback user interface, comprising:
   a back cover;
   a front cover coupled to the back cover to form an enclosure, wherein the front cover is coupled to the back cover for relative motion therebetween;
   a haptic feedback transducer coupled to the back cover, the haptic feedback transducer including an actuator;
   an electronics module coupled to the back cover by a boss and positioned between the front cover and the actuator;
   a transfer plate coupled to the actuator of the haptic feedback transducer and coupled to the front cover, wherein the transfer plate comprises an aperture through which the boss extends.

15. The haptic feedback user interface of claim 14, wherein the front cover comprises a flange that extends past the electronics module towards the back cover, wherein the transfer plate is coupled to the flange of the front cover.

16. The haptic feedback user interface of claim 15, wherein the electronics module is a display.

17. The haptic feedback user interface of claim 16, wherein the front cover comprises an aperture with a transparent surface placed therein for viewing the display therethrough.

18. The haptic feedback user interface of claim 17, further comprising:

a touch sensor coupled to the transparent surface and configured to detect a touch of the transparent surface.

19. The haptic feedback user interface of claim 18, wherein the touch sensor is one of a capacitive touch sensor, a resistive touch sensor, or a strain gauge.

20. The product dispenser of claim 1, wherein the pattern of haptic feedback to the surface is a pattern of vibration waves or pressure waves.

* * * * *